(12) United States Patent
Öttl et al.

(10) Patent No.: US 9,989,362 B2
(45) Date of Patent: Jun. 5, 2018

(54) ACTUATOR ELEMENT FOR SETTING THE TARGET MARK OF A SIGHTING TELESCOPE

(71) Applicant: Swarovski-Optik KG., Absam (AT)

(72) Inventors: Peter Öttl, Mils (AT); Helmut Wiedermann, Pill (AT)

(73) Assignee: Swarovski-Optik KG. (AT)

( * ) Notice: Subject to any disclaimer, the term of this patent is extended or adjusted under 35 U.S.C. 154(b) by 65 days.

(21) Appl. No.: 14/967,573

(22) Filed: Dec. 14, 2015

(65) Prior Publication Data

US 2016/0169672 A1    Jun. 16, 2016

(30) Foreign Application Priority Data

Dec. 15, 2014   (AT) .............................. A 50907/2014

(51) Int. Cl.
| | |
|---|---|
| G01B 11/00 | (2006.01) |
| G01C 15/00 | (2006.01) |
| F41G 1/38 | (2006.01) |
| G02B 23/16 | (2006.01) |

(52) U.S. Cl.
CPC ............. *G01C 15/004* (2013.01); *F41G 1/38* (2013.01); *G02B 23/16* (2013.01)

(58) Field of Classification Search
CPC ......... G01C 15/004; F41G 1/38; F41G 11/00; G02B 23/16; A45C 5/14; A45C 7/00; A45C 5/146
See application file for complete search history.

(56) References Cited

U.S. PATENT DOCUMENTS

| | | | |
|---|---|---|---|
| 6,691,447 B1 | 2/2004 | Otteman | |
| 2008/0289239 A1* | 11/2008 | Menges | .................... F41G 1/38 42/125 |
| 2009/0166140 A1* | 7/2009 | Gorga | .................... A45C 5/146 190/18 A |
| 2011/0100152 A1 | 5/2011 | Huynh | |
| 2014/0137458 A1 | 5/2014 | Crispin | |

FOREIGN PATENT DOCUMENTS

EP       1959221 A2    8/2008

* cited by examiner

*Primary Examiner* — Jamil Ahmed
(74) *Attorney, Agent, or Firm* — Lerner, David, Littenberg, Krumholz & Mentlik, LLP

(57) ABSTRACT

The invention relates to an actuator element for setting the position of a target mark of a sighting telescope having a front module and a rear module, and the front module and rear module are connected to one another by means of a coupling mechanism, which coupling mechanism can be manually actuated in order to separate the front module from the rear module.

25 Claims, 3 Drawing Sheets

ACTUATOR ELEMENT FOR SETTING THE TARGET MARK OF A SIGHTING TELESCOPE

BACKGROUND OF THE INVENTION

The invention relates to an actuator element for setting the position of a target mark of a sighting telescope of the type outlined in the introductory part of claim 1. When test firing a weapon in conjunction with a sighting device or a sighting telescope, deviations of the actual point of impact of a shot from the desired point of impact or position of the target mark are usually eliminated initially by changing the orientation of the inner tube bearing the target mark with the aid of actuator elements of a generic type. In a known manner, this process of zeroing in takes place at a fixed range (for example 100 m) with a horizontally oriented line of sight onto a target and using typical ammunition for the weapon. Actuator elements of the generic type, also known as adjusting turrets, also enable account to be taken of variations from the original test firing conditions which occur in practice. These influencing factors which have to be taken into account include above all a target distance that is different from the original firing range as well as ballistic characteristics of the ammunition or bullet used. An approach known from the prior art, therefore, is to provide actuator elements of the generic type with one or more, push-fit index elements. With the aid of the markings provided on the index elements, settings can be rapidly set on the adjusting turrets to enable allowance to be made for the differences in range and/or types of ammunition used. Also known from the prior art are actuator elements used as so-called side turrets by means of which allowance can be made for side wind. The disadvantage of actuator elements known from the prior art is that making changes to the settings of the index elements is often complicated and tedious and can only be done using tools. Making such changes to the settings is also very susceptible to errors. The objective of the invention is to propose an actuator element by means of which setting the position of a target mark of a sighting telescope is made easier and can be undertaken with greater flexibility.

BRIEF SUMMARY OF THE INVENTION

The objective is achieved by the invention by means of an actuator element for setting the position of a target mark of a sighting telescope having a front module and a rear module, which front module and rear module are connected to one another by a coupling mechanism and the coupling mechanism can be manually operated in order to separate the front module from the rear module. The advantage of this is that the front module can be very easily separated from the rear module, which remains on the sighting telescope, by a user without the need for additional tools for this purpose. However, one particular advantage of the actuator element is that front modules designed for specific or different functions can be used in virtually any combination with the same rear module.

Based on another advantageous embodiment of the actuator element, in order to indicate a pre-definable position of the target mark, the front module has a scale and the rear module has a zero index. The front module preferably comprises a carrier sleeve, and the scale is applied to this carrier sleeve. Based on another advantageous embodiment, at least one index element for indicating a pre-definable position of the target mark is secured to the rotating sleeve in a fixed arrangement so as to rotate in unison with it. Furthermore, the rear module comprises a lock housing, a spindle mounted in the lock housing so as to be rotatable about an axis of rotation and a locking hub which can be rotated about the axis of rotation in order to move the spindle. The carrier sleeve is also coupled with the locking hub so as to rotate in unison with it.

Also of advantage is another embodiment whereby the coupling mechanism constitutes a part of a locking mechanism and the locking mechanism comprises a tensioning system with pre-tensioned springs. The locking mechanism also has a control element which is actively connected to the tensioning system, and when the control element is operated, the connection between the front module and rear module can be released. The control element of the locking mechanism is preferably provided in the form of a push-button.

Whilst it has been said in connection with separating and fitting the front module and rear module of the actuator element proposed by the invention that this procedure may be operated manually, it should be explicitly understood that this can be done without the aid of special separate tools. In other words, a user merely needs to use the hands in order to release or re-establish the connection between the front module and rear module.

Based on a preferred embodiment, an actuator element for setting the position of a target mark of a sighting telescope is provided, which comprises a lock housing, a spindle mounted in the lock housing so as to be rotatable about an axis of rotation, a locking hub which can be rotated about the axis of rotation in order to move the spindle and a carrier sleeve. The carrier sleeve is coupled so as to rotate with the locking hub and at least one index element for indicating a pre-definable position of the target mark is secured to the carrier sleeve so as to be prevented from rotating relative to it. The carrier sleeve and the at least one index element constitute parts of a front module. The lock housing, spindle and locking hub are constituent parts of a rear module. The front module and rear module of the actuator element are connected to one another by means of a locking mechanism, and the locking mechanism comprises a tensioning system with pre-tensioned springs. The advantage of this is that front modules that are set differently but are based on the same modular-type design can easily be used interchangeably with the actuator element based on this design. This also means that a greater number of pre-set positions of the target mark are available.

However, this design of the actuator element is also of advantage in the event of damage to the front module because it can easily be replaced by a reserve front module but the rear module can also still continue to be used on its own.

The locking mechanism advantageously comprises a push-button which is actively connected to the tensioning system, and the connection between the front module and rear module can be released by operating the push-button. Accordingly, a simple manual operation of the push-button is sufficient and no special additional tool is necessary.

Due to the design of the actuator element whereby the tensioning system of the locking mechanism has at least two stable positions, the tensioning system can be maintained in an open state on the one hand and a closed state on the other hand, thereby making it easier to remove the front module as well as to fit the front module on the rear module.

Based on another embodiment of the actuator element, the tensioning system of the locking mechanism comprises sleeves which are disposed coaxially with the axis of rotation and are able to slide one inside the other. The advantage of this is that it results in a compact inner structure because even though the sleeves are based on a thin-walled design, a relatively high mechanical stability can nevertheless be achieved.

The locking mechanism comprises a carrier sleeve and a locking sleeve which is able to slide in the carrier sleeve, and in a bottom end region of the locking sleeve at least one radially extending tunnel is provided and at least one retaining ball is disposed in the tunnel and the at least one retaining ball can be moved to and fro in the radial direction. Depending on the position of the retaining ball at one or the other end of the tunnel, the retaining ball may double up to fulfil the function of a block or lock to prevent relative movements of the locking sleeve in the axial direction.

Another advantageous embodiment of the actuator element is one where the locking sleeve has at least one axially extending slot and the carrier sleeve has at least one pin which sits in engagement with the slot. This defines a significantly more restricted displacement path of the locking sleeve as a result. In the case of the actuator element, the locking hub comprises a top tube portion which has a circumferentially extending groove on an internal face and furthermore when the front module and rear module are connected, the bottom end region of the locking sleeve is accommodated in the top tube portion of the locking hub, and the at least one retaining ball is latched in the groove of the locking hub. The advantage of this is that a positive connection can be established in every angular position of the front module relative to the rear module.

The locking mechanism of the actuator element further comprises an outer clamping sleeve and a first, outer compression spring which is disposed and held clamped between the carrier sleeve and the outer clamping sleeve. The advantage of this is that when the connection is released by operating the push-button, the entire front module is automatically lifted due to the effect of this compression spring.

Also of advantage is the fact that the locking mechanism comprises an inner clamping sleeve and a second, inner compression spring, which is disposed and held clamped between the locking sleeve and the inner clamping sleeve. In addition, when the front module and rear module are connected, a bottom end region of the inner clamping sleeve sits against the at least one retaining ball and holds it lodged in the circumferentially extending groove of the locking hub. This means that a closed state is automatically maintained.

Also of advantage are other embodiments of the actuator element whereby the inner clamping sleeve has a circumferentially extending groove on an external face and in an intermediate position when separating the front module and rear module, the at least one retaining ball is at least partially accommodated in the circumferentially extending groove of the clamping sleeve, and once the front module has been separated from the rear module, the at least one retaining ball is retained in its radial position in the tunnel (49) by a narrowed region disposed in the outer end region of the tunnel (49). The retaining ball can therefore be held in a defined position.

Also with respect to the actuator element, the carrier sleeve has an outwardly projecting top disk portion at a top end region which is connected to the carrier sleeve, and the disk portion is screwed into the carrier sleeve by means of a thread. A threaded ring is also mounted in the top end region of the carrier sleeve, by means of which the inner clamping sleeve is held clamped by means of the second inner compression spring. The locking mechanism of the actuator element can therefore be easily assembled and then disassembled again.

Also of advantage is another embodiment of the actuator element whereby the push-button is connected to the inner clamping sleeve via an interconnected compression spring. The push-button is therefore held in a defined position and delays the action on the tensioning system of the locking mechanism by the spring travel which has to be initially overcome. Any inadvertent or unintentional separation of the front module from the rear module can therefore be largely prevented.

Also of advantage is another embodiment of the actuator element whereby the push-button comprises an axle pin which latches with catch lugs on an inwardly extending projection of the inner locking sleeve. The connection between the push-button and the locking sleeve can therefore be easily established but can also be released again.

Furthermore, the push-button is held in a maximum raised position by means of the compression spring disposed between the inner clamping sleeve and the push-button.

Other details of this invention will be explained with reference to an example of a preferred embodiment in the description of the drawings given below.

To provide a clearer understanding, the invention will be described in more detail with reference to the appended drawings.

BRIEF DESCRIPTION OF THE DRAWINGS

These are highly simplified, schematic diagrams illustrating the following.

DETAILED DESCRIPTION

Figure 1:
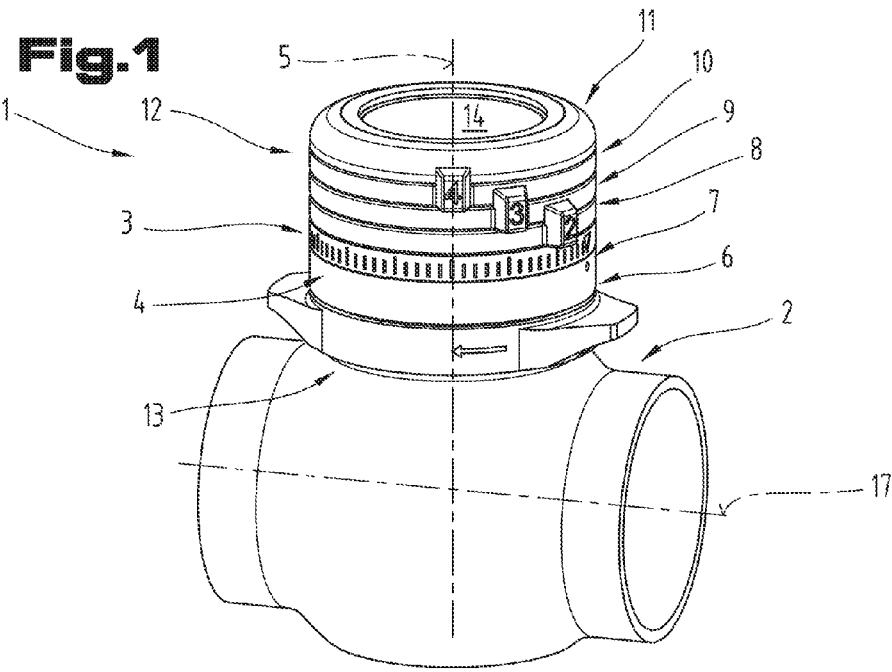
FIG. 1 is a perspective diagram illustrating an actuator element disposed on the main tube of a sighting telescope.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described.

FIG. 1 is a perspective diagram illustrating an actuator element 1 proposed by the invention for setting the position of a target mark of a sighting telescope in a position mounted on a tube 2 of the sighting telescope. The top part of the actuator element 1 firstly comprises a carrier sleeve 3 with a scale 4 applied to it to indicate the degree of a rotation about an axis of rotation 5. The annular region of the carrier sleeve 3 bearing the scale 4 simultaneously acts as a first index element for indicating the set position of the target mark of the sighting telescope. To this end, a zero index 7 is provided on an index ring 6 disposed underneath the carrier sleeve 3 in a non-rotating arrangement. Towards the top, adjoining the first index element of the carrier sleeve 3, is a second index element 8, a third index element 9 and a fourth index element 10. These index elements 8, 9, 10 sit in a push-fit mounting on the carrier sleeve 3 and are connected so as to rotate in unison with it. At a top end region of the carrier sleeve 3, finally, above the fourth index element 10, a cap ring 11 is screwed onto the carrier sleeve 3. The index elements 8, 9, 10 connected to the carrier sleeve 3 in this manner constitute, in conjunction with the carrier sleeve 3 and screw-on cap ring 11, a setting knob 12 of the actuator element 1.

In order to fix the respective angular position of the index elements 8, 9, 10 on the carrier sleeve 3 and prevent a rotation, the cap ring 11 moves into engagement with the index elements 8, 9, 10 as it is screwed onto the carrier sleeve 3 in such a way that the latter are ultimately pressed against one another and thus fixed due to a frictional force generated. In the case of the preferred embodiment described as an example here, however, mutually meshing toothing is provided between the index elements 8, 9, 10 and a cylindrical surface of the carrier sleeve extending parallel with the direction of the axis of rotation 5, which prevent the index elements 8, 9, 10 from inadvertently turning when in the state pushed onto the carrier sleeve 3 due to a positive fixture. This technical solution is described in detail in document EP 1 959 221 A2 owned by the same applicant.

The actuator element 1 further comprises a blocking ring 13, which is also disposed in its end region facing the tube 2 of the sighting telescope. This blocking ring is designed to be rotatable or pivotable about the axis of rotation 5. The blocking ring 13 enables the setting knob 12 to be fixed in its angular position and thus prevents the setting knob 12 from inadvertently turning.

Also visible in the diagram of FIG. 1, finally, is a push-button 14 in the cap ring 11 which can be operated by a user. As will be explained in more detail below, this can be used to fit the actuator element 1 in a first module part which remains on the tube 2 of the sighting telescope on the one hand and a second module part which can be removed from it on the other hand. The modular construction of the actuator element obtained as a result enables a very convenient and rapid interchangeable replacement of setting knobs 12 that are different but of a corresponding modular design.

Figure 2:
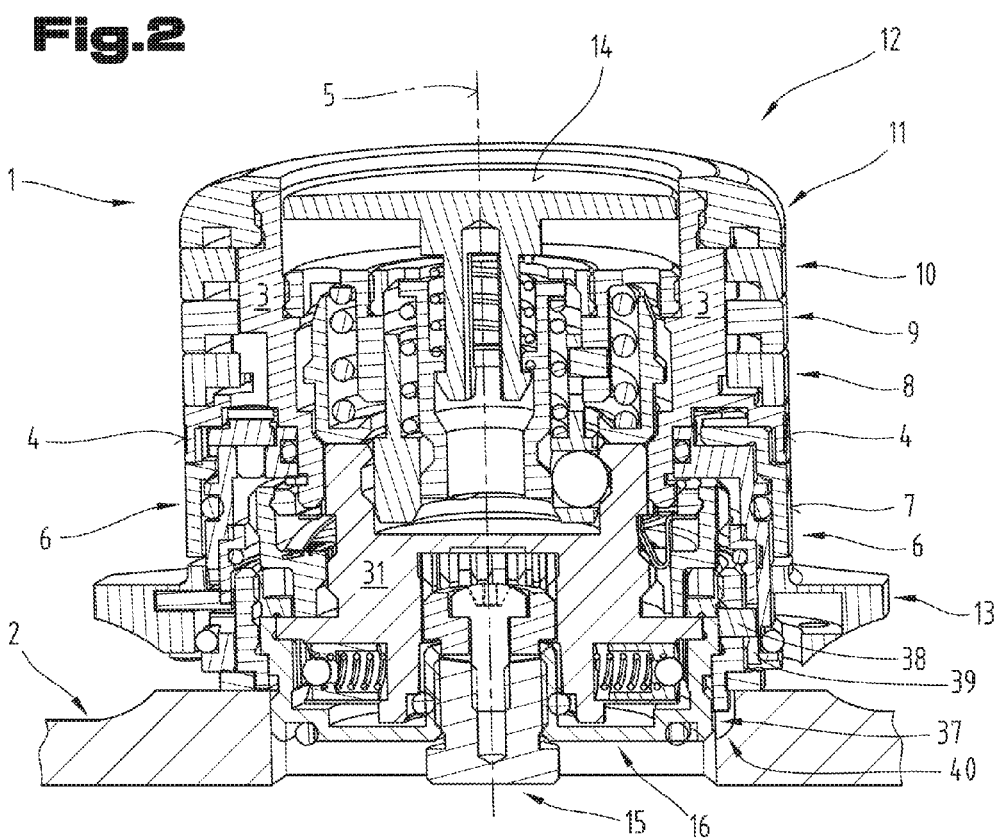
FIG. 2 is a longitudinal section of the actuator element.

FIG. 2 shows a longitudinal section along the axis of rotation 5 of the actuator element 1 in a partial perspective view. First of all, the jointly rotatable parts of the setting knob 12 of the actuator element 1 already described above may be seen. These include in particular the carrier sleeve 3 with the second, third and fourth index elements 8, 9, 10 pushed onto it and the cap ring 11 holding them in a fixed position. The rotating movement of the setting knob 12 is ultimately transmitted to a spindle 15 mounted in a thread so as to be rotatable about the axis of rotation 5 in a lock housing 16. The lock housing 16 is in turn screwed into a co-operating orifice of the tube 2 of the sighting telescope, and the spindle 15 extends out from the bottom of the lock housing 16. In a manner known from the prior art, the spindle 15 pushes against an inner tube (not illustrated) disposed in the tube 2 of the sighting telescope and bearing the target mark or reticle. Depending on the degree to which the spindle 15 protrudes out from the lock housing 16, the inner tube is oriented to a more or less inclined degree relative to a longitudinal axis 17 of the tube 2. Screwing the spindle 15 in or out therefore enables the position of the target mark or reticle to be changed when looking through the sighting telescope. In a manner also known from the prior art, such an adjustment causes a change in the spatial position of the line of sight of the sighting telescope relative to the barrel axis of the firearm on which the sighting telescope is mounted.

Figure 3:
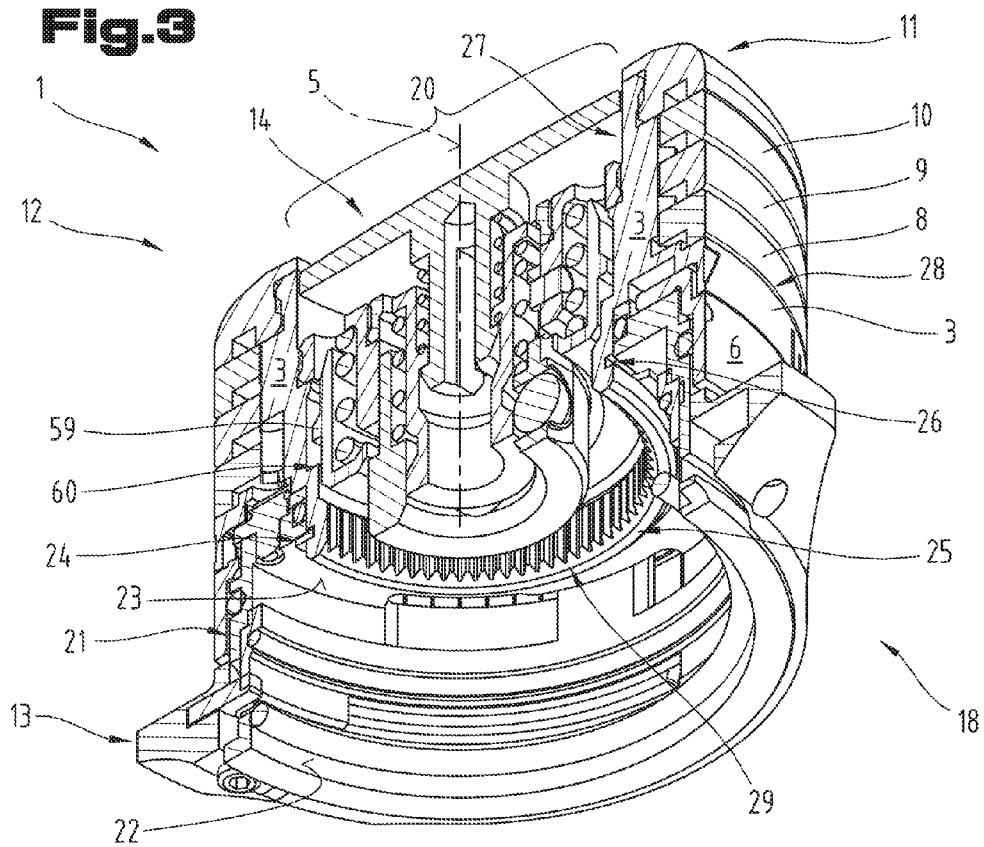
FIG. 3 is a longitudinal section of the front module of the actuator element.
Figure 4:
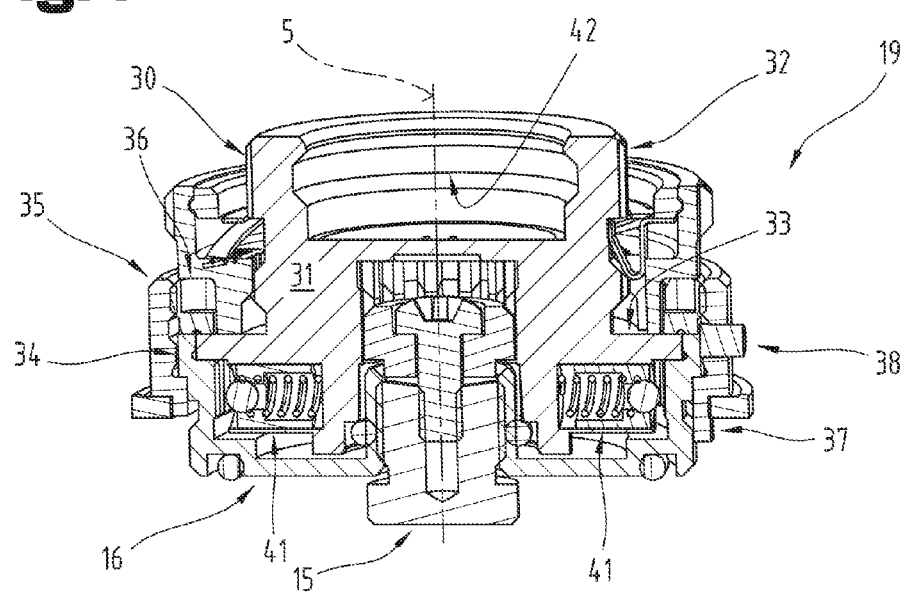
FIG. 4 is a longitudinal section of the rear module of the actuator element.
Figure 5:
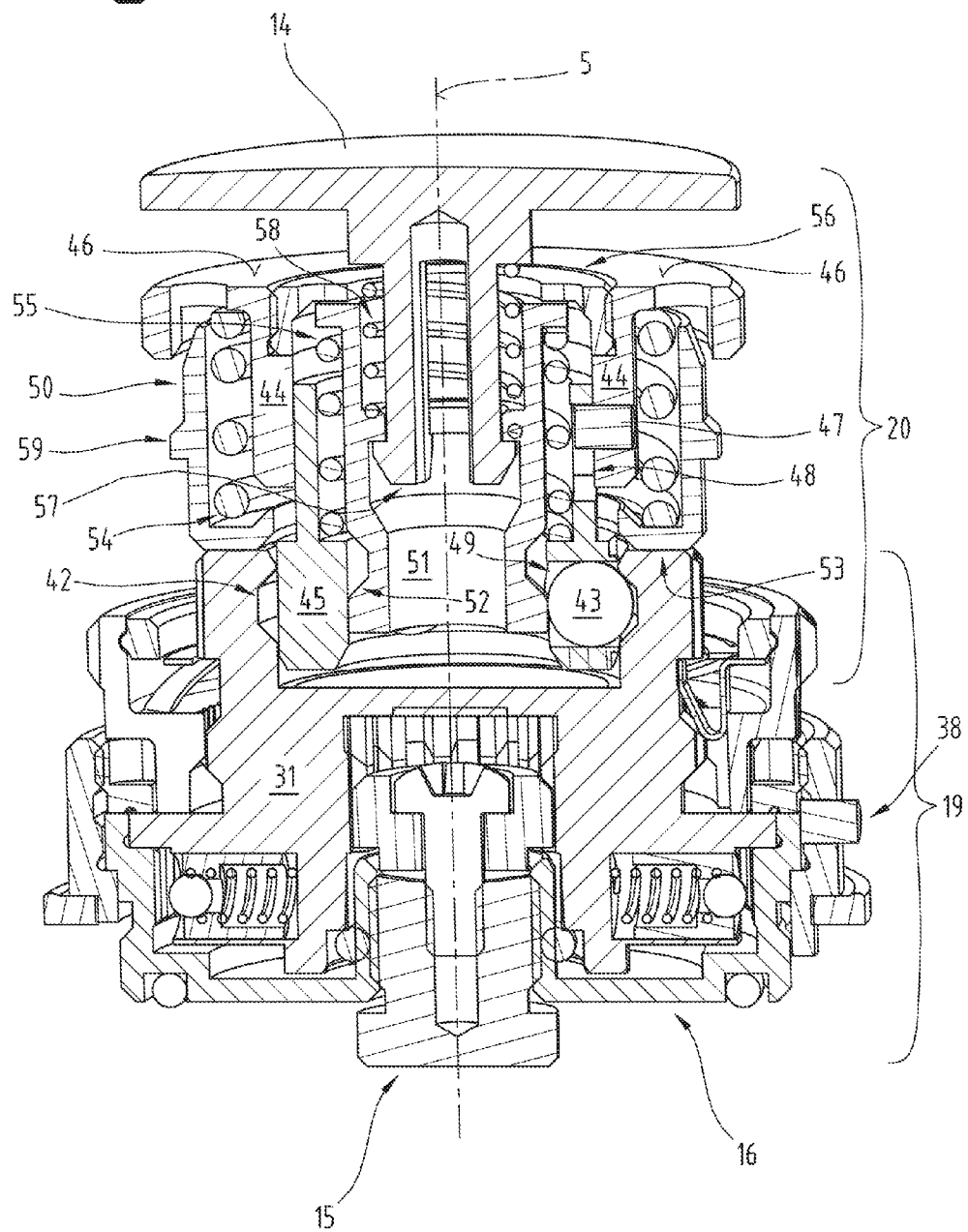
FIG. 5 is a detail of the locking mechanism disposed on the rear module, viewed in section.

The modular construction of the actuator element 1 proposed by the invention may be seen more clearly from the diagrams of FIGS. 3 to 5. FIG. 3 illustrates a front module 18 and FIG. 4 a rear module 19 of the actuator element, separately in each case. FIG. 5, finally, illustrates the rear module 19 with a locking mechanism 20 of the front module 18 (FIG. 3) attached to it. To provide greater clarity, the other parts of the front module 18 are not illustrated.

The front module 18 has an intermediate housing 21 constituting a stationary housing part—when in the state attached to the rear module 19. The intermediate housing 21 has, as components conforming to its shape, a substantially tubular portion 22 and adjoining it, an inwardly directed collar in the form of an annular disk-shaped portion 23. The setting knob 12 is mounted on the intermediate housing 21 so as to be rotatable due to the fact that the carrier sleeve 3 is inserted in the collar-shaped portion 23 of the intermediate housing 21 and secured by a locking ring 24 in the axial direction (of the axis of rotation 5). For this purpose, a groove 26 for accommodating the locking ring 24 is provided in the external circumference of a bottom sleeve portion 25 of the carrier sleeve 3.

The carrier sleeve 3 can be roughly divided into the bottom sleeve portion 25, a top sleeve portion 27 and an outwardly extending collar 28 disposed between the bottom sleeve portion 25 and top sleeve portion 27. The scale 4 mentioned earlier on is applied to the circumference of the collar 28 of the carrier sleeve 3.

In order to direct or transmit a rotating movement to the spindle 15 of the actuator element 1 when the setting knob 12 is operated, the bottom sleeve portion 25 of the carrier sleeve 3 has internally lying toothing 29. When attached to the rear module 19 (FIG. 2), this toothing 29 of the carrier sleeve 3 meshes with complementary externally lying toothing 30 of a locking hub 31 rotatably mounted in the rear module 19. Adjacent to a top tube portion 32, the locking hub 31 has an outwardly projecting disk portion 33 (FIG. 4). By means of this disk portion 33, the locking hub 31 is mounted so as to be rotatable on a top edge 34 of the pot-shaped lock housing 16. The top outer edge 34 of the lock housing 16 is therefore enclosed by a positioning ring 35 having a threaded ring 36. The positioning ring 35 is thus mounted on the edge 34 of the lock housing 16 in the manner of a cap nut. The top edge 34 of the lock housing 16 on the one hand and the threaded ring 36 on the other hand enclose the disk portion 33 and thus determine the axial position of the locking hub 31. The lock housing 16, positioning ring 35 and threaded ring 36 thus form a bearing for the locking hub 31 which is rotatable about the common axis of rotation 5.

Driven by the setting knob 12, the rotating movement of the locking hub 31 is then transmitted to the spindle 15, which in turn is mounted so as to be rotatable in the thread of the lock housing 16. Another special feature of this embodiment of the actuator element 1 described by way of example is the fact that the movements of the spindle 15 and locking hub 31 in the direction of the axis of rotation 5 are uncoupled from one another. To this end, the spindle 15 has external toothing at its top end region, which meshes with co-operating internal toothing of the locking hub 31 (FIG. 4). Whilst the spindle 15 effects an upward and downward movement during a rotation, the axial position of the locking hub 31 remains unchanged. The same applies to the setting knob 12 and to the front module 18 as a whole. The advantage of this is that the height by which the actuator element 1 projects out from the tube 2 always remains unchanged.

On at least one point of its circumference, the positioning ring 35 is provided with a downwardly extending lug 37. In addition, a pin 38 which extends radially outwards is also provided on its circumference. When the front module 18 and rear module 19 are in the assembled state, the pin 38 of the positioning ring 35 moves accordingly into an axially extending recess 39 (FIG. 2) in the internal face of the sleeve-shaped portion 22 of the intermediate housing 21. On the other hand, a recess 40 for accommodating the lug 37 of the positioning ring 35 is provided in the opening in tube 2 for screwing in the actuator element 1. Due to the lug 37 and the pin 38 of the positioning ring 35, therefore, an anti-rotation lock is obtained so that the intermediate housing 21 of the front module 18 is oriented, relatively speaking, in terms of its relative position with respect to the positioning ring 35 and the tube 2 of the sighting telescope. As an alternative to the described pin 38, it would also be possible to use a key as a means of preventing rotation.

In the fully assembled state, i.e. when both the lock housing 16 has been firmly screwed into the tube 2 and the front module 18 has been fitted onto the rear module 19 and secured, the lock housing 16, positioning ring 17 and intermediate housing 21 together form a non-rotating housing. Relative to this housing, the setting knob 12, locking hub 31 and spindle 15 of the actuator element 1 are jointly rotatable.

In a manner known from the prior art, a catch 41 is provided between the locking hub 31 and the lock housing 16. As a result of the catch 41, the rotation of the locking hub 31 is always incremented, i.e. in steps, by a predefined smallest angular unit. The pitch or incrementation of the catch 41 advantageously corresponds to the pitch provided on the scale 4.

As already mentioned, a locking mechanism 20 is provided which acts between the front module 18 and the rear module 19 to enable these two modules to be attached to one another. To this end, the top tube portion 32 of the locking hub 31 has a circumferentially extending groove 42 in its internal face. Due to the locking mechanism 20 provided in the setting knob 12, a retaining ball 43 is positioned and held in such a way that a positive connection is established and maintained between the locking hub 31 and the retaining ball 43 or locking mechanism 20.

A locking action is therefore obtained between the locking mechanism 20 of the front module 18 and the top tube portion 32 of the locking hub 31 of the rear module 19, whereby the retaining ball 43 acts as a lock or block which engages in the groove 42. The top tube portion 32 of the locking hub 31 thus acts as a so-called stop piece of the lock mechanism. By operating the locking mechanism 20, the retaining ball 43 can be moved backwards and forwards between different positions. In the position of the retaining ball 43 illustrated in FIG. 5, the latter prevents the front module 18 from being lifted off in the direction of the axis of rotation 5 due to a positive connection with the groove 42 of the top tube portion 32 of the locking hub 31.

To provide greater clarity, the rear module 19 is illustrated in conjunction with the locking mechanism 20 in FIG. 5 but without the other parts of the front module 18 (FIG. 3). It is possible to establish and release the connection between the front module 18 and rear module 19 in a particularly simple manner with the aid of this locking mechanism 20. In particular, no special or additional tool is needed for this purpose. In order to release the connection, it is sufficient to depress the push-button 14 of the locking mechanism 20. The process of both releasing and re-establishing the connection therefore takes place semi-automatically.

The locking mechanism 20 is provided in the form of a so-called tensioning system, i.e. a switch element having pre-tensioned springs that is capable of assuming different stable positions. The different positions of the mechanism of the locking mechanism 20 enable the retaining ball 43 to be switched from an open position, in which the retaining ball 43 is not lodged in the groove 42 of the tube portion 32 of the locking hub 41, into a closed position in which the retaining ball 43 is lodged in the groove 42.

Based on this embodiment of the actuator element 1, the locking mechanism 20 comprises several sleeve-type elements which are coaxially displaceable one inside the other, the relative position of which is determined by means of pre-tensioned springs acting between them. These elements include, firstly, a carrier sleeve 44 with a locking sleeve 45 which is able to slide telescopically inside it. Carrier sleeve 44 and carrier sleeve 3 together form a stationary housing part of the locking mechanism 20 (FIG. 3). To this end, the carrier sleeve 44 has an outwardly protruding top disk portion 46 with a thread, by means of which the carrier sleeve 44 can be screwed into carrier sleeve 3. A radially oriented pin 47 is also connected to the carrier sleeve 44, which locates in a slot 48 provided in the locking sleeve 45 or is engaged with the slot 48. The pin 47 serves as a stop by means of which the range of movement by which the locking sleeve 45 is able to move in the direction of the axis of rotation 5 is restricted.

Finally, the locking sleeve 45 has a radially oriented tunnel 49 for the retaining ball 43 at its bottom end region. The tunnel 49 therefore allows the position of the retaining ball 43 to be changed in the radial direction.

To ensure a symmetrical distribution of forces and prevent any jamming of the sleeves sliding one inside the other, it is of advantage to provide at least two or also more retaining balls 43 or pins 47 and slots distributed equidistantly around the circumference. Based on this embodiment, three of these elements are distributed respectively at an angle—distance of 120° in each case around the circumference.

In addition to the carrier sleeve 44 and locking sleeve 45, the locking mechanism 20 also has an outer clamping sleeve 50 and an inner clamping sleeve 51, which are likewise able to slide axially (in the direction of the axis of rotation 5). Disposed in a bottom end region of the inner clamping sleeve 51, a circumferentially extending groove 52 for accommodating the retaining balls 43 is provided in the external surface. Furthermore, the outer clamping sleeve 50 also has an inwardly projecting disk portion 53 in its bottom end region. Depending on the position assumed by the bottom end region and groove 52 of the inner clamping sleeve 51 and the disk portion 53 of the outer clamping sleeve 50 relative to the tunnel 49 in the locking sleeve 45, the retaining balls 43 lie either in the groove 42 of the locking hub 31 or in the groove 52 of the inner clamping sleeve 51.

In order to hold the different sleeves 44, 45, 50, 51 fixed in their position relative to one another, the locking mechanism 20 also has appropriately pre-tensioned springs which between them expend a corresponding displacement force or retaining force. In this respect, there is a first outer compression spring 54, which acts between the carrier sleeve 44 and the outer clamping sleeve 50. Secondly, a second, inner compression spring 55 is provided, clamped between the locking sleeve 45 and the inner clamping sleeve 51. The outer compression spring 54 and the inner compression spring 55 are each provided in the form of a cylindrical coil spring. Accordingly, the outer compression spring 54 is disposed in a gap between an internal diameter of the outer clamping sleeve 50 and an external diameter of the carrier sleeve 44. The inner compression spring 55, on the other hand, is disposed in a cylindrical gap between an internal diameter of the locking sleeve 45 and an external diameter of the inner clamping sleeve 51. In the assembled state, the compression springs 54, 55 exert spring forces which are directed parallel with the axis of rotation 5. Accordingly, the first outer compression spring 54 is supported at the top on the disk portion 46 of the carrier sleeve 44 and at the bottom on the disk portion 53 of the outer clamping sleeve 50. The second inner compression spring 55 is supported at the bottom on the locking sleeve 45 and at the top on the inner clamping sleeve 51. The inner clamping sleeve 51 and the locking sleeve 45 are also jointly secured to the inner compression spring 55 by a threaded ring 56 in the carrier sleeve 44. To this end, the threaded ring 56 is screwed into the carrier sleeve 44 in the region of the disk portion 46.

The push-button 14 for manually operating the locking mechanism 20 is connected to the inner clamping sleeve 51 and is resiliently mounted in the inner clamping sleeve 51 for this purpose. Alternatively, the push-button 14 could also be rigidly connected to the inner clamping sleeve 51. Based on this embodiment, the push-button 14 has an axle pin 57 with a slot which is latched by catch lugs to an inwardly extending projection of the inner locking sleeve 51, and the axle pin 57 is also displaceable in the direction of the axis of rotation 5. A compression spring 58 disposed between the inner clamping sleeve 51 and the push-button 14 holds the push-button 14 in a maximum raised position. As a result, the downward movement of the inner clamping sleeve 51 in order to actuate the locking mechanism 20 is not initiated until after a delay. In the first phase, the compression spring 58 is only compressed initially and it is not until the push-button 14 makes contact with the top end of the inner clamping sleeve 51 that the inner clamping sleeve 51 is pushed downwards.

The diagram of FIG. 5 shows the locking mechanism 20 in the closed position. The outer compression spring 54 is disposed between the carrier sleeve 44 and the outer clamping sleeve 50 and is thus in its maximum compressed state. The inner compression spring 55, on the other hand, is disposed between the locking sleeve 45 and the inner clamping sleeve 51 and carrier sleeve 44 in a released state. The retaining balls 43 are therefore lodged in the groove 42 of the locking hub 31 and the retaining balls 43 in the tunnel 49 of the locking sleeve 45 are prevented from changing their position by the bottom edge region of the inner clamping sleeve 51. The retaining balls 43 and the groove 42 of the locking hub 31 therefore establish a positive connection between the rear module 19 and the front module 18 of the actuator element 1 which is maintained as long as the inner clamping sleeve 51 is not moved downwards by depressing the push-button 14.

In order to open the locking mechanism 20 between the rear module 19 and front module 18, the push-button 14 is manually depressed and once the restoring force of the compression spring 58 of the push-button 14 has been overcome, the inner clamping sleeve 51 finally moves downwards. As a result, the groove 52 is moved to the degree that the retaining balls 43 are able to change their position in the tunnel 49 of the locking sleeve 45 and are then accommodated by the groove 52 of the inner clamping sleeve 51. This change in the position of the retaining balls 43 is assisted by the spring force generated as the outer compression spring 54 between the outer clamping sleeve 50 and carrier sleeve 44 is released. The expansion of this second outer compression spring 54 simultaneously has the effect of lifting the entire front module 18 connected to the carrier sleeve 44 off the rear module 19. The bottom disk portion 53 of the outer clamping sleeve 50 is thus supported on the top tube portion 32 of the locking hub 31 *ab*. Together with the carrier sleeve 44, the locking sleeve 45 also moves further upwards relative to the outer clamping sleeve 50 and is thus retracted into the interior of the outer clamping sleeve 50. The bottom disk portion 43 of the outer clamping sleeve 50 moves so that it lies in a top region of the height or diameter of the tunnel 49 of the locking sleeve 45. The downward movement of the outer clamping sleeve 50—relative for carrier sleeve 44—is restricted by an annular, circumferentially extending projection 59 on the outer clamping sleeve 50 and a co-operating step 60 on the internal face of the carrier sleeve 3.

During the process of opening the locking mechanism 20, the retaining balls 43 remain in the groove 52 of the inner clamping sleeve 51 but only for a short time. As the locking sleeve 45 moves farther out of the top tube portion 32 of the locking hub 31, the retaining balls 43 in the tunnel 49 can be pushed back outwards again. This is made possible by the displacement of the inner clamping sleeve 51 relative to the locking sleeve 45 caused by the expansion of the inner compression spring 55. At the same time, the retaining balls 43 are pushed outwards by the bottom end region of the inner clamping sleeve 51 as a result. A narrowed region (not illustrated) in the outer end region of the tunnel 49 prevents the retaining balls 43 from falling out of the tunnels 49. The front module 18 can then be lifted in its entirety farther off the rear module 19 and the two modules completely separated from one another.

When the locking mechanism 20 is switched from the closed to the open state, the tension of the outer compression spring 54 also changes. The outer compression spring 54 undergoes a change from a maximum tensed state to a released state. The inner compression spring 55, on the other hand, is initially compressed due to the movement of the inner clamping sleeve 51 relative to the locking sleeve 45, whereupon it is transferred to its original released state.

Conversely—when the front module 18 of the actuator element 1 has to be connected to the rear module 19 again—a switch of the tensioning of the two compression springs 54, 55 takes place in the reverse sequence in each case. When the front module 18 is fitted on the rear module 19, the retaining balls 43 or lock elements 43 initially move so that they lie on the internal face of the top tube portion 32 of the locking hub 31. To this end, the top tube portion 32 of the locking hub 31 is preferably provided with a bevel on its inner edge. The front module now has to be pushed downwards under the resistance of the inner compression spring 55. As a result, the locking sleeve 45 moves axially upwards in the carrier sleeve 44 until the retaining balls 43 are pushed into the circumferentially extending groove 52 of the inner clamping sleeve 51. The bottom disk portion 53 of the outer clamping sleeve 50 then also moves so that it lies against the top tube portion 32 of the locking hub 31 of the rear module 19 and the resistance of the outer compression spring 54 then has to be overcome. As soon as the front module 18 has been pushed far enough down for the retaining balls 43 to move into the circumferentially extending groove 42 of the locking hub 31, they are pushed into it due to the action of the inner compression spring 55. The inner compression spring 55 moves the inner clamping sleeve 51 so far upwards again that its bottom end region holds the retaining balls 43 firmly lodged in the groove 42 of the locking hub 31. The closed state of the locking mechanism 20 is re-established as a result.

When the front module 18 is fitted on the rear module 19, therefore, the locking sleeve 45 is firstly moved upwards relative to the inner clamping sleeve 51 and against the force of the inner compression spring 55. As this happens, the retaining balls 43 effect a sequence of movements in the tunnels 49, firstly moving into the groove 52 of the inner clamping sleeve 51 and then switching over, back into the groove 42 of the locking hub 31. The bottom end region of the inner clamping sleeve 51 then assumes a position relative to the tunnels 49 whereby the retaining balls 43 are prevented from being able to move back out of the groove 42 of the locking hub 31 again. The locking mechanism 20 of the actuator element 1 is then disposed back in its original closed state in which a positive connection is maintained between the retaining balls 43 and the groove 42 of the locking hub 31.

The ability of the locking sleeve 45, inner clamping sleeve 55 and outer clamping sleeve 54 to move relative to one another and relative to the carrier sleeve 44 as well as the interplay of the spring forces of the outer compression spring 54 and inner compression spring 55 enable the front module 18 to be fitted merely by pushing on it without having to operate the push-button 14. Based on this design, the locking mechanism 20 therefore enables the actuator element 1 to be operated with comfort by a user. In order to assemble the front module 18 and rear module 19, it is sufficient to take hold of the front module 18 by its casing, fit it onto the rear module 19 and push downwards whilst the locking mechanism 20 latches automatically.

The structural design of the connection between the front module 18 and rear module 19 based on a full circumferentially extending groove 42 and locking means in the form of balls (retaining balls 43) offers a particular advantage in that the connection between the locking sleeve 45 and locking hub 31 can be established for any angular position relative to the axis of rotation 5. All that determines the relative angular position between the front module 18 and rear module 19 in this embodiment are the pin 38 in the positioning ring 35 and the axially extending recess 39 provided for it in the internal face of the intermediate housing 21 of the front module 18. When the front module 18 is fitted on the rear module 19, therefore, the recess 39 and the pin 38 of the positioning ring 35 have to be oriented relative to one another first of all. In other words, assembly of the two modules 18, 19 cannot be continued until the pin 38 of the positioning ring 35 is accommodated in the recess 39 of the intermediate housing 21.

Based on the embodiment described above as an example, the locking mechanism 20 together with the push-button 14 is designed to effect the requisite switching movements of its individual parts. Based on alternative embodiments, however, the locking mechanism 20 may also be operated by other control elements instead of the push-button 14. For example, as control elements, it would also be possible to provide a rotating knob or lever handle but also a control ring or sliding sleeve linearly displaceable in the axial direction.

Also based on another alternative option to the embodiment described above, instead of the retaining balls 43, it would also be possible to use lock elements of a different design as parts of the coupling mechanism or locking mechanism 20. Such an alternative lock element might be, for example, an elongate pin with rounded ends, mounted in the tunnel 49. Such a pin could also have a cross-section other than a round cross-section. Accordingly, the cross-section of the tunnel 49 could also have a profiled cross-section complementing such a profiled pin.

In an alternative embodiment based on another design, it would also be possible to opt for a tunnel 49 extending upwards at an angle or downwards at an angle instead of the radially extending orientation of the tunnel 49.

As an alternative to providing the groove 42 on the internal circumference of tube portion 32 of the locking hub 31, a groove for accommodating the retaining balls 43 could also be provided on an external circumference of the locking hub 31.

Another possibility for an alternative embodiment of the actuator element 1 is one in which the locking mechanism 20 is integrated in the rear module 19 rather than in the front module 18.

In principle, the design of the actuator element 1 in the form of a front module 18 and a rear module 19 connected to one another by the described coupling mechanism or locking mechanism 20 is of particular advantage because setting knobs 12 of the same corresponding design can be swapped easily, i.e. without the use of additional tools. With this design of the actuator element 1, therefore, the retail product may be supplied initially with the sighting telescope and a setting knob 12 of a more basic type (for example without additional index elements 8, 9, 10). If so desired, the actuator element 1 can be then be retrofitted at a later time with setting knobs 12 having index elements 8, 9, 10.

In particular, the design of the actuator element 1 proposed by the invention based on a front module 18 and a rear module 19 may also be retrofitted with additional functions provided in the setting knobs 12. For example, it would be possible to supply a retrofitted setting knob 12 with functional elements or control elements of a distance meter, a compass, a lamp or also a laser pointer, for example.

Another advantage is that in the event of damage to the setting knob 12, it can be removed separately and sent for repair whilst the sighting telescope and the weapon to which it is fitted can remain with the user.

The embodiments illustrated as examples represent possible variants of the actuator element 1, and it should be pointed out at this stage that the invention is not specifically limited to the variants specifically illustrated, and instead the individual variants may be used in different combinations with one another and these possible variations lie within the reach of the person skilled in this technical field given the disclosed technical teaching.

Furthermore, all conceivable variants which can be obtained by combining individual details of the variants described and illustrated are possible and constitute independent inventive solutions in their own right.

The objective underlying the independent inventive solutions may be found in the description.

All the figures relating to ranges of values in the description should be construed as meaning that they include any and all part-ranges, in which case, for example, the range of 1 to 10 should be understood as including all part-ranges starting from the lower limit of 1 to the upper limit of 10, i.e. all part-ranges starting with a lower limit of 1 or more and ending with an upper limit of 10 or less, e.g. 1 to 1.7, or 3.2 to 8.1 or 5.5 to 10.

Above all, the individual embodiments of the subject matter illustrated in the drawings constitute independent solutions proposed by the invention in their own right. The objectives and associated solutions proposed by the invention may be found in the detailed descriptions of these drawings.

For the sake of good order, finally, it should be pointed out that, in order to provide a clearer understanding of the structure of the actuator element 1, it and its constituent parts are illustrated to a certain extent out of scale and/or on an enlarged scale and/or on a reduced scale.

The invention claimed is:

1. An actuator element for setting the position of a target mark of a sighting telescope having a front module and a rear module, wherein the front module and rear module are connected to one another by a coupling mechanism, which coupling mechanism can be manually actuated in order to separate the front module from the rear module, wherein a locking hub is rotatably mounted in the rear module and the rear module comprises a lock housing, a positioning ring and a threaded ring forming a bearing for the locking hub, wherein the front module comprises an intermediate housing and a setting knob mounted on the intermediate housing, the setting knob being rotatable relative to the intermediate housing, wherein when the front module is in a state attached to the rear module the intermediate housing constitutes a stationary housing part, in that the intermediate housing is in a rotation preventing engagement with the positioning ring.

2. The actuator element according to claim 1, wherein in order to indicate a pre-definable position of the target mark, the front module comprises a scale and the rear module comprises a zero index.

3. The actuator element according to claim 1, wherein the front module comprises a carrier sleeve and the scale is applied to the carrier sleeve.

4. The actuator element according to claim 3, wherein at least one index element for indicating a pre-definable position of the target mark is secured to the carrier sleeve so as to be prevented from rotating relative to it.

5. The actuator element according to claim 3, wherein the rear module comprises a lock housing, a spindle mounted in the lock housing so as to be rotatable about an axis of rotation and a locking hub rotatable about the axis of rotation for moving the spindle.

6. The actuator element according to claim 5, wherein the carrier sleeve is coupled in rotation with the locking hub.

7. The actuator element according to claim 5, wherein the coupling mechanism constitutes a part of a locking mechanism and the locking mechanism comprises a tensioning system with pre-tensioned springs.

8. The actuator element according to claim 7, wherein the locking mechanism comprises a control element which is actively connected to the tensioning system, and when the control element is operated, the connection between the front module and rear module can be released.

9. The actuator element according to claim 8, wherein the control element of the locking mechanism is provided in the form of a push-button.

10. The actuator element according to claim 7, wherein the tensioning system of the locking mechanism comprises sleeves which are disposed coaxially with the axis of rotation and which are able to slide one inside the other.

11. The actuator element according to claim 9, wherein the locking mechanism comprises a carrier sleeve and a locking sleeve which is able to slide in the carrier sleeve, and at least one radially extending tunnel is provided in a bottom end region of the locking sleeve, and at least one retaining ball is disposed in the tunnel and the at least one retaining ball is able to move to and fro in the radial direction.

12. The actuator element according to claim 11, wherein the locking sleeve has at least one axially extending slot and the carrier sleeve has at least one pin engaging with the slot.

13. The actuator element according to claim 11, wherein the locking hub comprises a top tube portion having a circumferentially extending groove in an internal face.

14. The actuator element according to claim 13, wherein the coupling mechanism comprises at least the locking sleeve with the retaining balls and the top tube portion of the locking hub with the groove.

15. The actuator element according to claim 13, wherein when the front module and rear module are in the connected state, the bottom end region of the locking sleeve is accommodated in the top tube portion of the locking hub, and the at least one retaining ball is lodged in the groove of the locking hub.

16. The actuator element according to claim 13, wherein the locking mechanism comprises an outer clamping sleeve and a first outer compression spring and the first outer compression spring is disposed and held clamped between the carrier sleeve and the outer clamping sleeve.

17. The actuator element according to claim 16, wherein the locking mechanism comprises an inner clamping sleeve and a second inner compression spring and the second inner compression spring is disposed and held clamped between the locking sleeve and the inner clamping sleeve.

18. The actuator element according to claim 17, wherein when the front module and rear module are in the connected state, a bottom end region of the inner clamping sleeve lies against the at least one retaining ball and holds it lodged in the circumferentially extending groove of the locking hub.

19. The actuator element according to claim 17, wherein the inner clamping sleeve has a circumferentially extending groove in an external face and in an intermediate position when separating the front module and rear module, the at least one retaining ball is at least partially accommodated in the circumferentially extending groove of the inner clamping sleeve.

20. The actuator element according to claim 17, wherein when the front module and rear module are in a separated state, the at least one retaining ball is retained in its radial position in the tunnel by means of a narrowed region in the outer end region of the tunnel.

21. The actuator element according to claim 11, wherein the carrier sleeve has an outwardly projecting top disk portion at a top end region which is connected to the carrier sleeve, and the disk portion is screwed into the carrier sleeve by means of a thread.

22. The actuator element according to claim 17, wherein a threaded ring is secured in the top end region of the carrier sleeve, by means of which the inner clamping sleeve is held clamped with the second inner compression spring.

23. The actuator element according to claim 17, wherein the push-button is connected to the inner clamping sleeve via an interconnected compression spring.

24. The actuator element according to claim 23, wherein the push-button comprises an axle pin which is provided with a slot and catch lugs, and the catch lugs are latched onto an inwardly extending projection of the inner locking sleeve.

25. The Actuator element according to claim 23, wherein the push-button is held fixed in a maximum raised position by means of the compression spring disposed between the inner clamping sleeve and the push-button.

* * * * *